May 27, 1952

R. H. ERNEST 2,598,242

GRAIN PUFFING MACHINE

Filed May 16, 1950

INVENTOR.
ROBERT H. ERNEST
BY
ATTORNEYS

May 27, 1952  R. H. ERNEST  2,598,242
GRAIN PUFFING MACHINE
Filed May 16, 1950  8 Sheets-Sheet 3

INVENTOR.
ROBERT H. ERNEST
BY
ATTORNEYS

INVENTOR.
ROBERT H. ERNEST
BY
ATTORNEYS

May 27, 1952  R. H. ERNEST  2,598,242
GRAIN PUFFING MACHINE
Filed May 16, 1950  8 Sheets-Sheet 6

INVENTOR.
ROBERT H. ERNEST
BY
Ely & Frye
ATTORNEYS

May 27, 1952

R. H. ERNEST 2,598,242

GRAIN PUFFING MACHINE

Filed May 16, 1950

INVENTOR.
ROBERT H. ERNEST
BY
ATTORNEYS

Patented May 27, 1952

2,598,242

UNITED STATES PATENT OFFICE 2,598,242

GRAIN PUFFING MACHINE

Robert H. Ernest, Akron, Ohio, assignor to The Quaker Oats Company, Chicago, Ill., a corporation of New Jersey Application May 16, 1950, Serial No. 162,225

27 Claims. (Cl. 99—238)

The present invention relates to the art of puffing edible grains or cereals, such as wheat or rice, for the manufacture of breakfast foods or the like. The process of puffing food stuffs is old and well known and, in general, comprises loading a charge of the grain in a heated chamber, generally termed a "gun," closing the chamber, rotating the chamber, and subjecting the grain to a pressure heating and cooking operation. After the grains have been thoroughly cooked and the pressure within the gun has been raised to the desired point, the head or gate on the gun is suddenly released, causing a violent explosion, which expands the grain to several times its normal size and discharges it from the gun.

The invention has for its object the designing of automatic mechanisms in connection with an otherwise standard gun for carrying out the several steps. Heretofore, the operation of the gun has been manual throughout and it is the purpose of this invention to devise a mechanism by which, after the gun is loaded, the operator, by two simple acts, will set the mechanism in motion, the head of the gun will be closed and locked, and the gun will start in rotation. Thereafter, the succeeding operations will proceed without any further attention on the part of the operator, the gun head being released or "fired" after the proper interval.

Not only are the operations conducted automatically, but the results are more uniform, as the sequence and timing of the operations are controlled by the mechanism and not by the individual. A single operator may take care of more of the puffing units than is possible under the old manual control system, thus reducing the cost of manufacturing puffed cereals.

Other objects and advantages will be realized as will be apparent to those familiar with this art.

In the drawings and the accompanying description, the best known and preferred form of the invention is disclosed, at it has been perfected for actual operation. The invention is not limited to details which are shown and described in order to make the invetnion clear to those skilled in the art, but changes and modifications, as well as improvements therein, are within the scope of the invention as set forth in the claims appended hereto.

The gun

The rotating gun, in which the grain is heated and subjected to the pressure for the later explosion and puffing, is given the reference numeral 1. At one end of the gun is the gate or head indicated generally by the numeral 2, which is tightly closed during the treatment of the grain and is then abruptly opened for the explosion.

Figure 3:
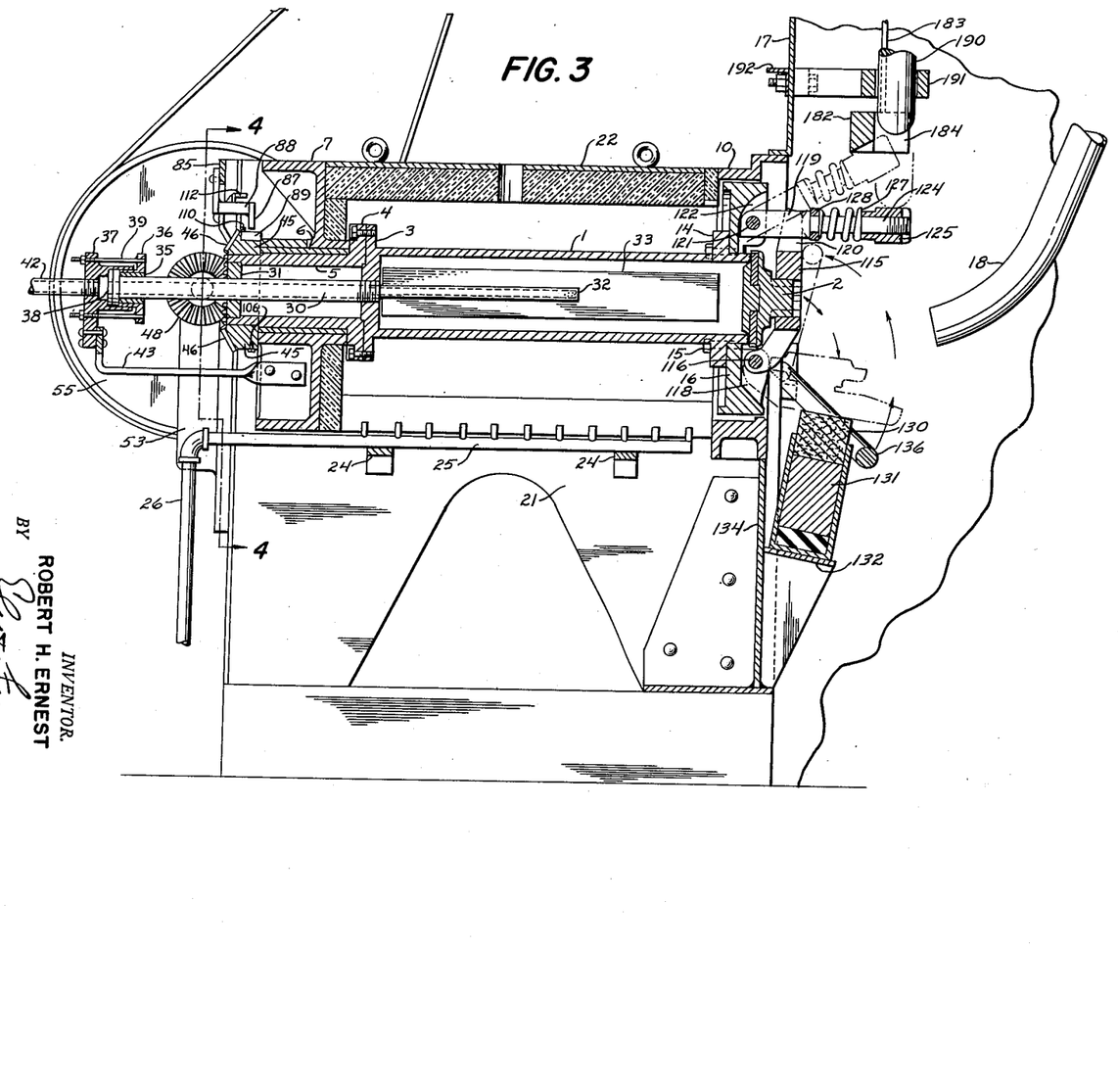
Fig. 3 is a vertical cross section on the axis of the heating chamber or gun, the head or gate of the gun being closed, as shown in full lines.
Figures 4, 5, 8:
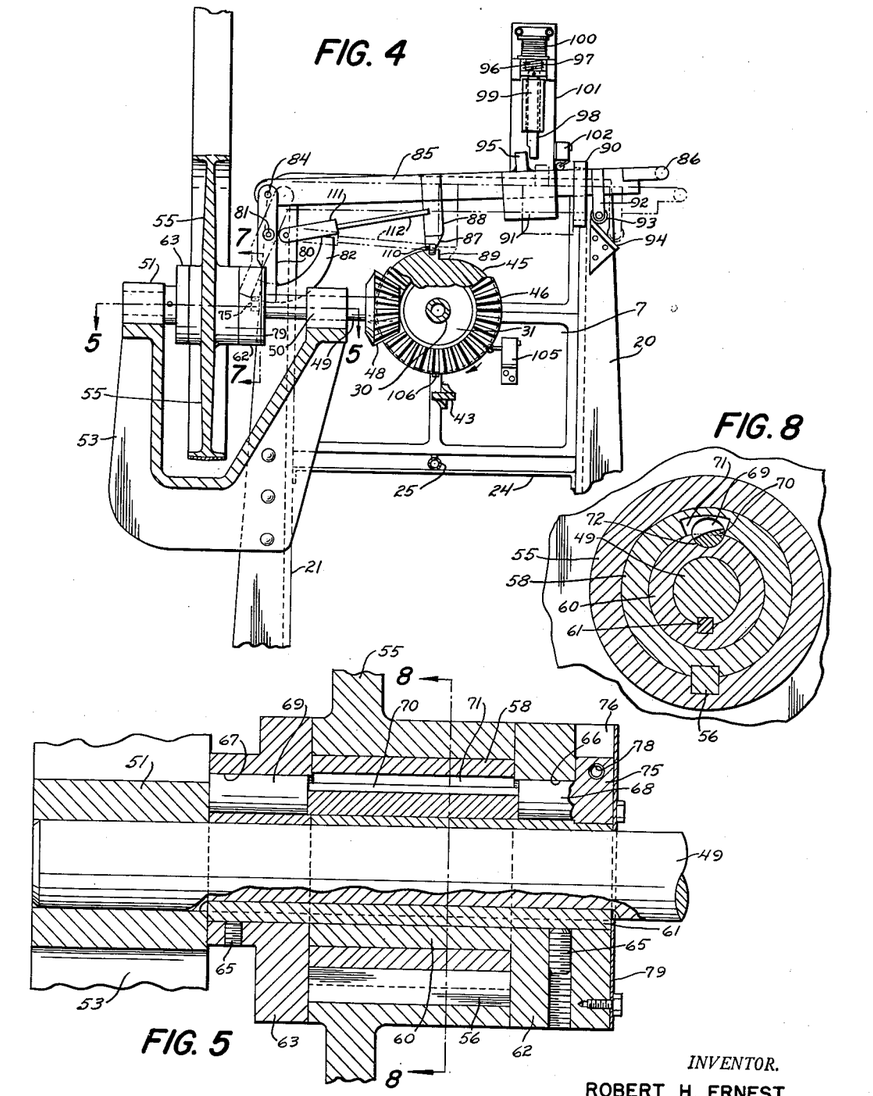
Fig. 4 is an end elevation of the gun looking toward the right as indicated by the section line 4—4 of Fig. 3. In this view the control lever is shown in full lines in raised position, or the position which it occupies while the gun is rotating.
Fig. 5 is a section through the driving clutch by which the gun is rotated, this view being on the line 5—5 of Figs. 4 and 7.
Fig. 8 is an enlarged section through the driving clutch on the line 8—8 of Fig. 5.

The end of the gun opposite the head is closed, as shown in Fig. 3, and is mounted by the flange 3 to a corresponding flange 4 on a rotatable sleeve 5 mounted in bearings 6 in the end wall 7 of the outer casing. The wall 7 is provided with reinforcing ribs as shown in Fig. 4. The opposite end of the casing is enclosed by an end wall 10 in which are journaled two rollers 12, which support the head-end of the gun. For this purpose, the head-end of the gun is provided with a flange 14, to which is secured, by the bolts 15, a relatively deep annular ring 16 which rides upon the rollers 12. This ring 16 also supports the head 2, the details of which will be referred to later. The end wall 10 is fitted in an opening in the wall 17 of the large bin into which the gun discharges the puffed grain. Located in the bin is the swinging feed chute 18 by which the operator loads the gun after each firing operation.

This chute receives a measured charge of grain from any of the standard forms of feeding-measuring devices, not shown.

Figures 6, 7:
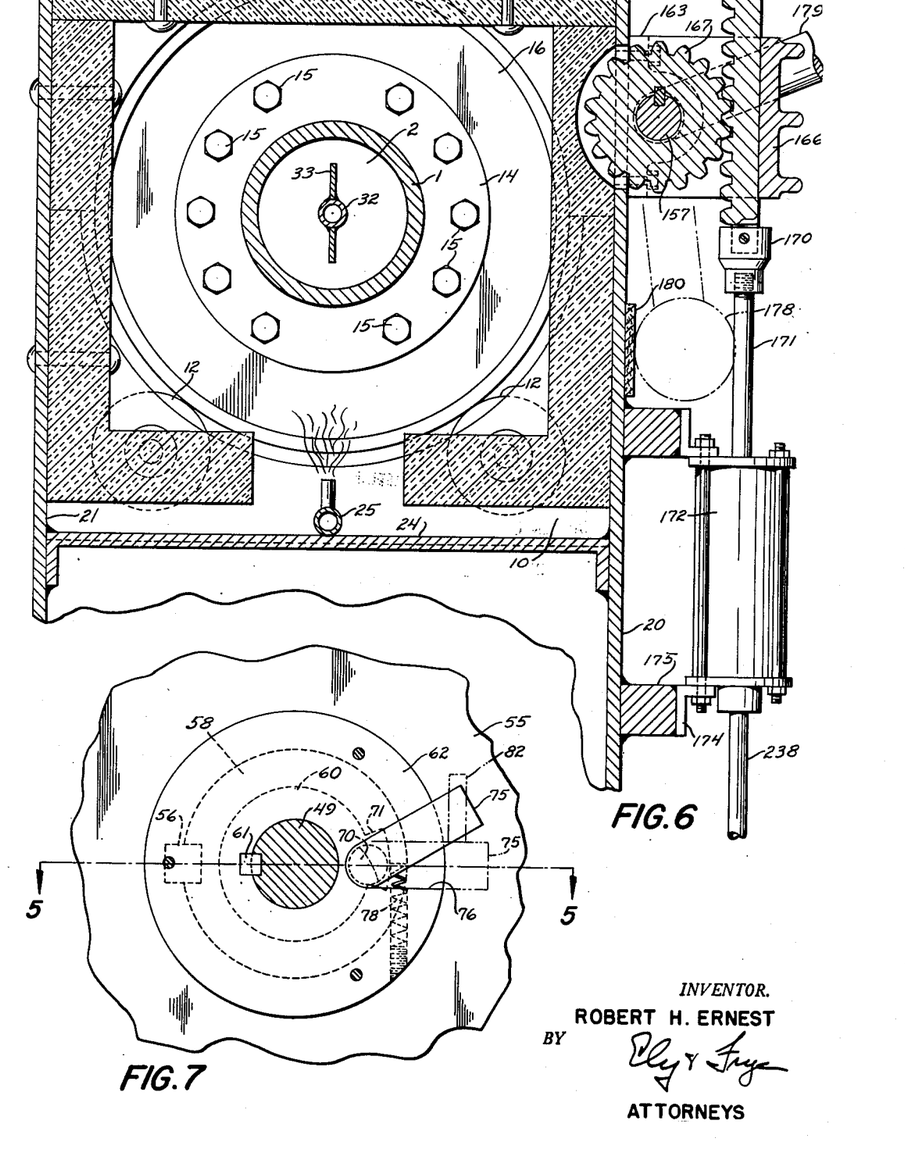
Fig. 6 is a transverse section on the line 6—6 of Fig. 1.
Fig. 7 is a section on the line 7—7 of Fig. 4.
Figure 12:
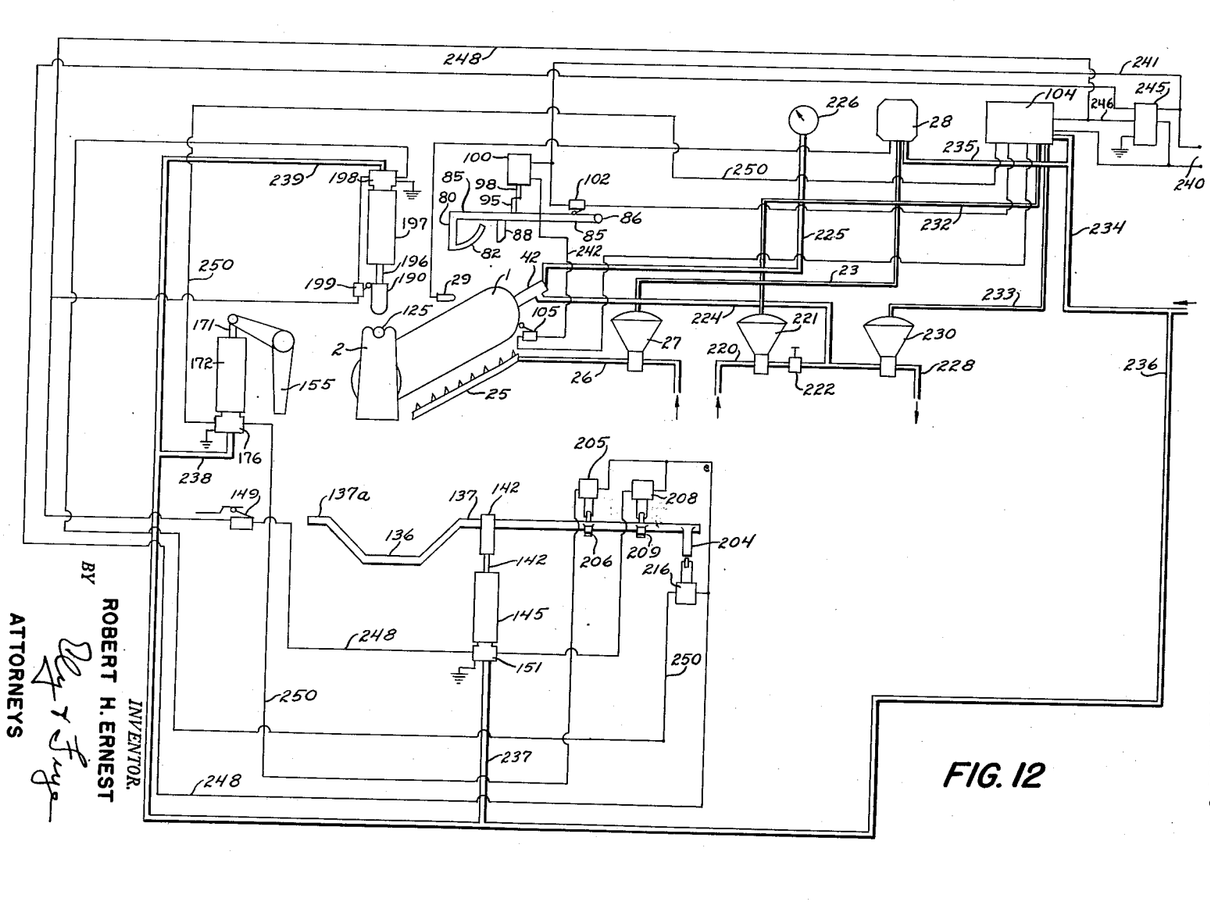
Fig. 12 is a diagrammatic view showing the electrical and pressure lines which control the mechanism.

The sides of the casing are formed by the front wall 20 and the rear wall 21, and the top of the casing by the removable cover 22. The interior of the casing, except at the head and for a narrow passage in which the heating burner is located, is lined with thick, heat-insulating blocks as shown in Figs. 3 and 6. The side walls are extended to form supports for the mechanism and in the gap at the base of the casing is located the long gas burner 25 supported on transverse bars 24. The burner is supplied from a line 26, in which is located the control valve 27 connected to operate through the air line 23 from any standard recording and temperature control instrument 28 which is responsive to a bulb 29 located in the side wall 21 of the casing (Fig. 12).

In the outwardly extending portion of the sleeve 5 is fitted a plate 31 and through the plate, and extending through the base of the gun, is the long steam conducting tube 30 in the inner or gun-end of which is set the steam distributing pipe 32, the outer end of which is perforated. Attached to the pipe 32 is the radial vane 33 which serves to agitate the contents of the drum as it rotates. The outer end of the tube 30 is received in a bearing 35 set in an adjustable two-part casing formed of the sections 36 and 37, held together by bolts 39 to compress a packing gland 38 against the end of the tube 30 to form a steam-tight, rotatable connection with the casing 36—37.

The section 37 of the casing is connected to the steam supply pipe 42 and is supported by a bracket 43 connected to the section 37 and to one of the ribs in the end wall 7.

Gun rotating mechanism

On the projecting end of sleeve 5 is fixed the hub 45 of a gun-rotating bevel gear 46, by which the gun is rotated through a bevel pinion 48 mounted on the end of a transverse shaft 49, which is rotatable in inner and outer bearing 50 and 51 carried on the U-shaped bracket 53 secured to the rear side plate 21.

The shaft 49 is rotated from the drive pulley 55 mounted thereon through the clutch shown in detail in Figs. 5, 7, and 8. In this connection, it will be noted that the pinion 48 is half the diameter of the bevel gear 46 and that the gun must be arrested in its rotation while the gate or head is upright, as shown in full lines in Fig. 3. The gun is set in rotation by the operator but it is stopped after the required interval by a timing mechanism, and the arrangement is such that the gun always stops in its proper upright position. The gun rotates in clockwise direction, as shown by the arrow on Fig. 4.

The hub of the pulley 55 is keyed at 56 to an outer sleeve 58, in which is rotatable an inner sleeve 60 keyed at 61 to the shaft 49. The sleeve 60 is formed as an extension from an end plate 662. The other side of the clutch assembly is enclosed by a second end plate 63. Set screws 65 are threaded in the two end plates and bear against the key 61.

In alignment in the plates 62 and 63 are sockets 66 and 67, in which are received and rotatable the cylindrical ends of a composite shiftable clutch pin, comprised of the two rollers 68 and 69 and an intermediate half-round driving key 70. The clutch pin is bisected by the line of contact between the sleeves 58 and 60 and in the inner face of the sleeve 58 is the slot or keyway 71 having the abrupt radial walls as shown in Fig. 8. In the outer surface of the sleeve 60 is the half round groove 72 in which the key 70 is received.

When the composite clutch pin, formed of the two end portions 68 and 69 and the intermediate driving key 70, is in the position shown in full lines in Fig. 8, the sleeves 58 and 60 are interlocked and the constantly driven pulley 55 will rotate the gun through the gears 46 and 48. When the key 70 is in the position shown in dotted lines in Fig. 8, the gun will be at rest.

The driving key 70 is rocked to and from driving position by a trigger or arm 75, which is formed as a part of the roller 68. This trigger oscillates in a V-shaped recess 76 formed in the outer surface of the end plate 62 and is yieldingly held in the position shown in full lines in Fig. 7 by a coil spring 78 set in the end plate. The spring thus urges the driving key assembly in the interlocking or driving position for the gun. A cover plate 79 is fastened to the face of the plate 62.

The trigger 75 is moved and held in the dotted line or non-driving position shown in Fig. 7 by the end of a rocking arm 80 pivoted on the rear side plate at 81 above the driving clutch. Arm 80 is provided with an arc-shaped extension 82 which extends about 90° from the end of the arm 80. When the arm 80 is in the vertical position shown in Fig. 4, the trigger 75 is free to move to its full line position shown in Fig. 7 under the urging of the spring 78 whenever the grooves 70 and 72 come into register, as shown in Fig. 8, thus driving the gun.

When, however, the arm 80 moves to its dotted line position in Fig. 4, this arm or the extension 82 intercepts the trigger 75 and moves it to and holds it in position so that the driving connection between the pulley 55 and the gun 1 is broken. This stops the rotation of the gun.

Figure 4A:
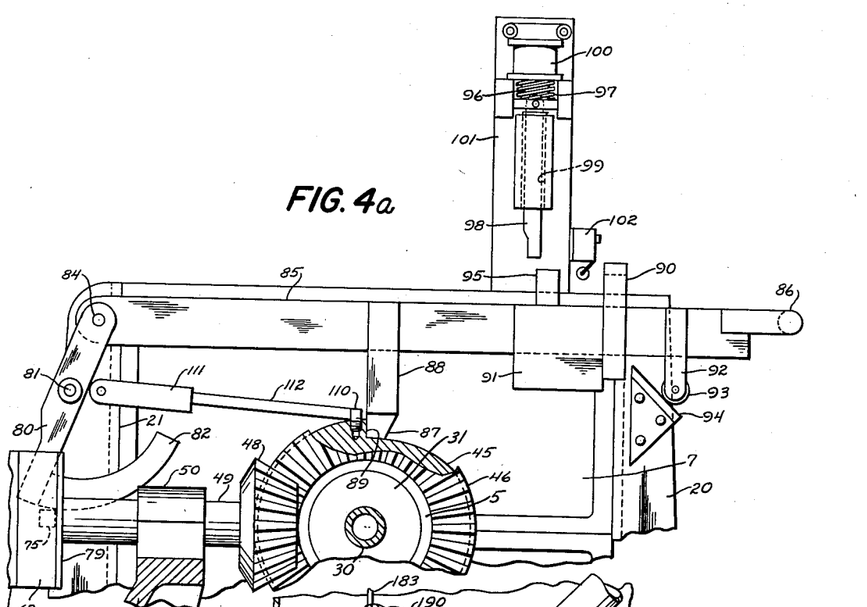
Fig. 4a is a view showing the position of the control lever when the gun is stationary.

The upper end of arm 80 is pivoted at 84 to one end of a long lever 85, which may conveniently be termed the starting lever. This lever extends to the right side of the machine where it is provided with an operating handle 86. At a midway point on the lever is a downwardly extending arm 88 having a rearwardly and downwardly extending finger 87 which is directly over the hub 45 of the large gun driving gear 46. The surface of the hub 45 is provided with a deep notch 89, the radial wall of which is adapted to strike against the finger 87 when the gun is arrested in its firing position, with the gate 2 upright as shown in Fig. 4a. It will be noted that the hub 45 is cut away for a substantial distance ahead of the radial wall. The outer end of the lever 85 is guided in its movement by a bracket 90 secured in the upper right hand corner of the end wall 7. A weight 91 on lever 85 comes to rest against the bracket 90 when the arm 85 is in its lowered position.

Outwardly of the bracket 90, the starting lever is provided with a second downwardly extending arm 92, on the lower end of which is a roller 93 which rides on the inclined surface of a guiding plate 94 attached to the front wall of the casing. Between the arms 88 and 92 the lever is provided with an upwardly extending lug or detent 95, which, when the lever is raised, lies immediately to the rear of the lower end of a shiftable holding pin or catch 98. This holding pin is guided for vertical movement in guide 99 and connected at its upper end to the core 96 of a solenoid 100, which is mounted on a bracket 101 on the top of the casing. The core 96 has a limit of downward movement which places it in front of the lug 95 when the lever 85 is raised as shown in Fig. 4. It may be moved upwardly against the force of a spring 97.

Figure 1:
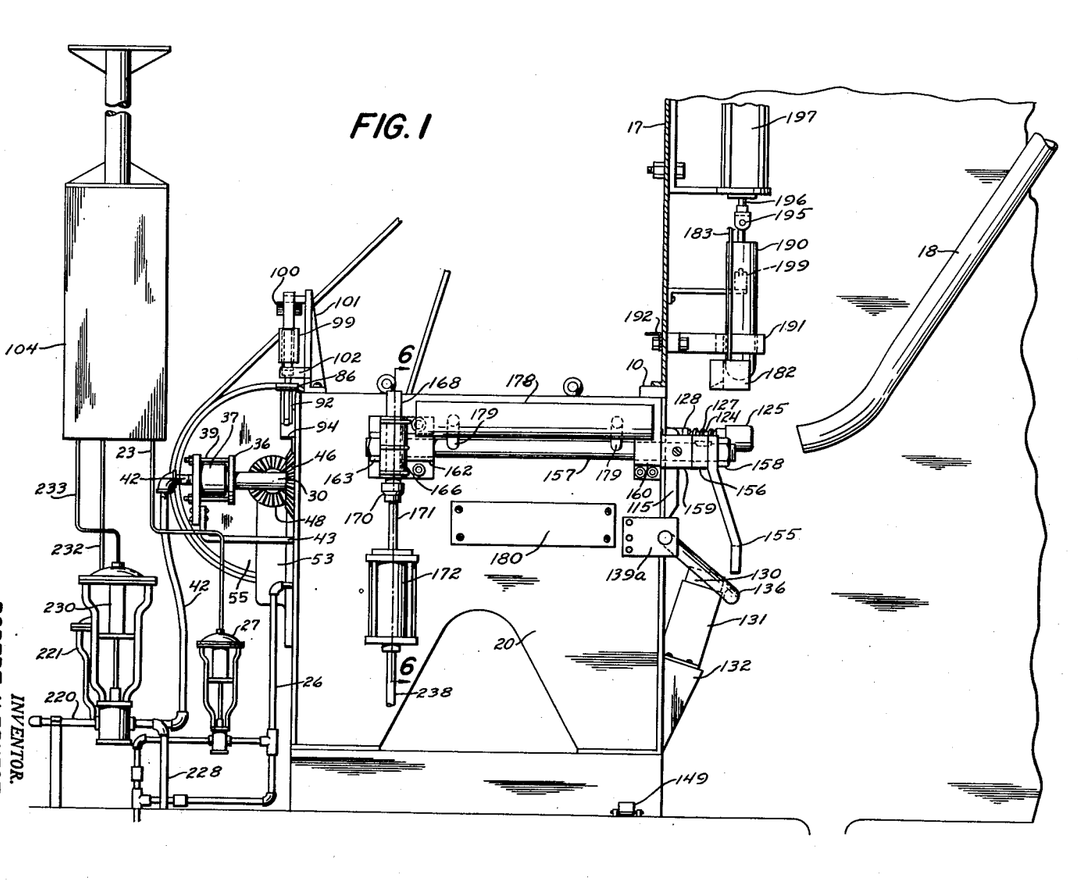
Fig. 1 is a side elevation of a complete installation.

Also mounted on the bracket 101 is a switch 102, the switch arm of which is in the path of the lever 85 and is closed when the starting lever is raised. This switch is arranged to close the circuit to a timer unit 104, which may be of a standard construction. The location of the timer in the circuits is shown in Fig. 12 and its physical location in Fig. 1. The timer controls the cooking, bleeding, and steaming periods and initiates the firing of the gun.

Located on the end wall 7, adjacent the gear 46, is a second switch 105, the switch arm of which extends toward the hub of the gear 46 in position to be struck and closed by a stud 106 on the hub 45. The switch 102 sets the timer in operation at the same time that the gun starts in rotation. The switch 105 is in series with the solenoid 100 and with a switch in the timer, and its purpose is to insure that the gun is arrested in its upright position. For this purpose the circuit to the solenoid will be partially closed by the switch in the timer and kept in that condition for a sufficient period for the switch 105 to complete the circuit.

When the solenoid 100 is energized, the holding pin 98 is moved upwardly to release the lever 85, which instantly drops to the lowered position shown in Fig. 4a and disconnects the gun and driving clutch, but this solenoid cannot be energized until the switch 105 is closed and the stud 106 is so located that this will not occur unless the gun is in the portion of its arc of rotation so that it will be arrested in upright position.

On the hub 45 is also located a stud 110 which may be referred to as the backlash preventing stud. Pivoted to the rear side wall 21 is an arm 111 having an extension 112 which is located above the hub 45 and is movable behind the stud when the gun is arrested. The arm 111 rests on the upper end of the extension 82 from the arm 80. Thus, when the lever 85 is released by the operation of the solenoid, it drops and moves downwardly as the roller 93 moves over the guide plate or track 94, as soon as the finger 87 enters the notch 89. This movement of the lever 85 lowers the arm 111—112 which rides over the stud 110 and comes to rest behind the stud at the same time that the finger 87 abuts the radial wall of the notch, and the gun driving clutch is released. The arm 111—112 prevents any return movement or backlash of the gun.

After the operator has placed the charge of grain in the gun and has closed the gun head by the mechanism to be described, he starts the gun in rotation by lifting the lever 85 and moving it backwardly until the lug 95 is behind the pin 98, the pin 98 yielding upwardly against the force of the spring 97. The upward movement of the lever closes the switch 102 and the timer starts in operation. It also moves the gun driving clutch through the trigger 75. So long as the pin 98 is in its lowered position, the lever is held in raised position and the gun continues in rotation until the timer sets the circuit to the solenoid 100 and the switch 105 is closed. Of course, the switch 105 is closed at each rotation of the gun but it is not effective until the switch in the timer has set the circuit to the solenoid. The energizing of the solenoid occurs as the arm 85 lowers and the finger 87 enters the notch, which stops the rotation of the gun as has been explained.

*Gun head operating mechanism*

Figure 9:
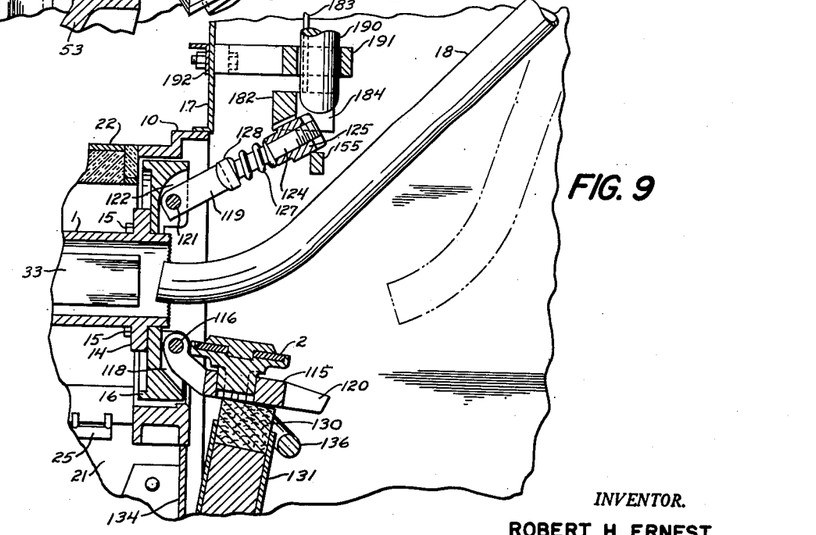
Fig. 9 is a view taken at the head of the gun with the gun opened.
Figures 10, 11:
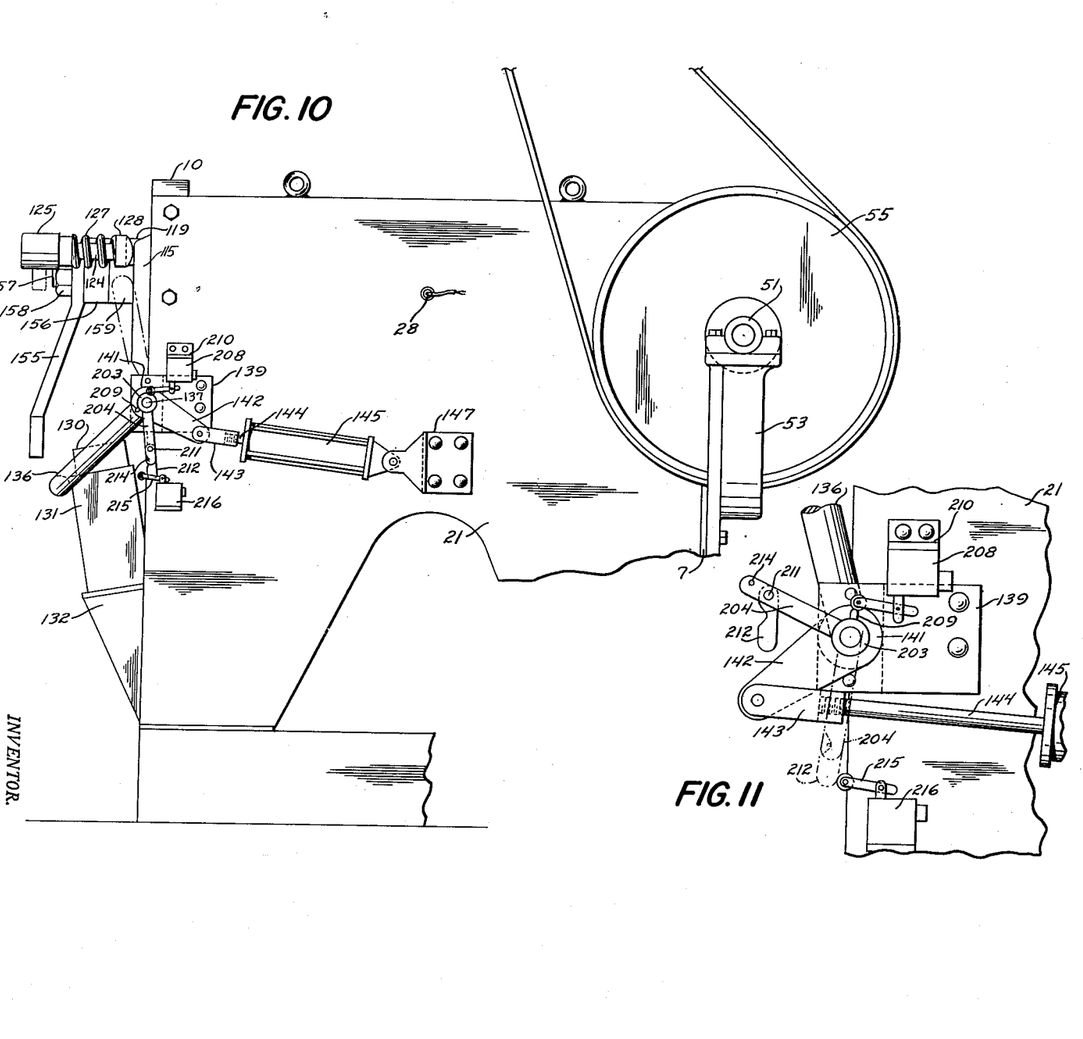
Fig. 10 is a view of the side of the machine looking in the opposite direction from Fig. 1.
Fig. 11 is an enlarged detail of parts shown in Fig. 10 but in a different position.

The gun head 2 is a heavy closure adapted to have a tight sealing relation with the mouth of the gun. It is mounted in an opening in the arm 115, one end of which is forked and pivotally mounted on a pin 116 carried on a web 118 formed in the face of the rotating ring 16. The other or free end of the arm 115 is also forked as shown at 120 to receive the locking arm 119. The locking arm is pivoted on a stud shaft 121 set in parallel webs 122 formed in the ring 16 opposite the web 118. The arm 119 is made with a flat section which enters the fork 120 when the head is locked. Beyond the flat portion, the arm is formed with a rounded extension 124, which is threaded at its outer end to receive a nut 125. Surrounding the extension 124 of the locking arm is a heavy coil spring 127 which is confined between the nut 125 and a locking ring 128, the outer portions of which that extend on either side of the flat portion of the arm being formed with rounded bearing surfaces, as shown in Figs. 9 and 10, which ride over the extremities of the arm 115 to hold the gun head tightly against the mouth of the gun. The pressure exerted by the spring 127 may be adjusted by the nut 125, which also receives the blow of the firing arm to be described. The ends of the arm 115 are rounded as shown in Figs. 3 and 9 to facilitate the movement of the locking ring over the ends of the arm 115.

When the gun is fired, which is by the opening of the head, the gate is thrown open by the expansion of the contents of the gun. As explained in connection with the description of the gun rotating mechanism, the gun is in the position shown in Figs. 2, 3, and 9 when its rotation is arrested just before the firing operation. As the gun head is opened with considerable violence, there is provided a heavy cushion block 130 which receives the impact of the head. This block is located in a holder 131 secured to a shelf 132 welded and braced on the bin side of a vertical plate 134 spanning and attached to the lower extensions of the side walls 20 and 21.

Figure 2:
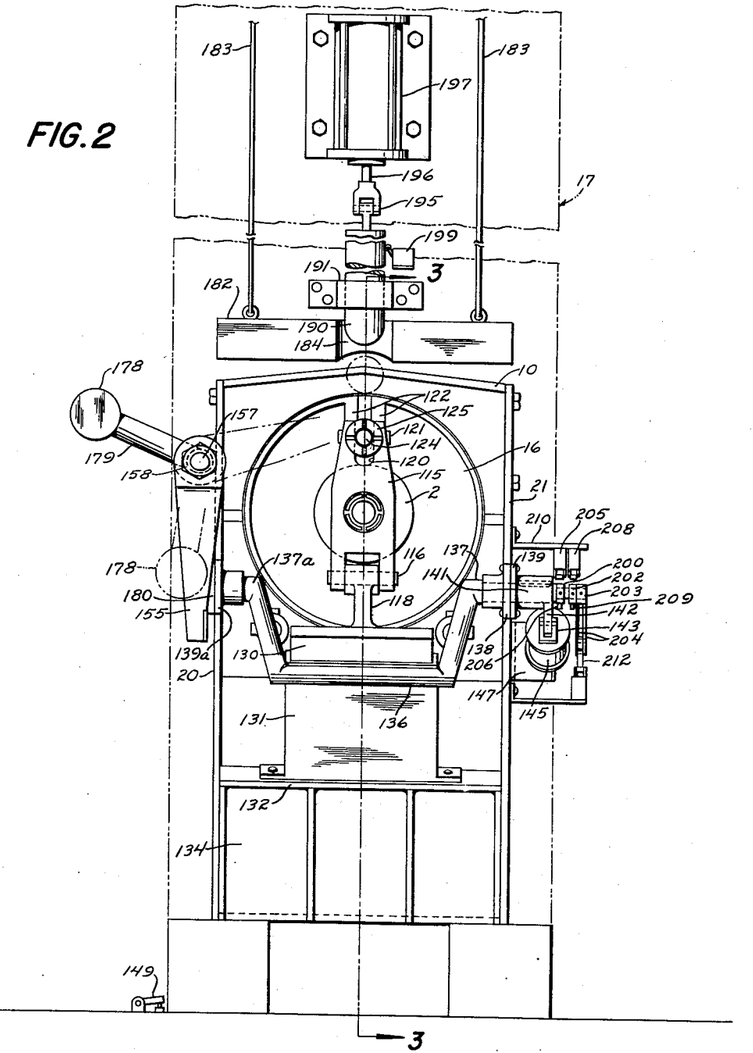
Fig. 2 is an end view thereof looking toward the left in Fig. 1.

In closing the gun head, the first operation is to lift the gun head from the position shown in Fig. 9 to the position shown in Fig. 2 and in full lines in Fig. 3. This is done by the head lifting arm which bears the numeral 136 and is normally in its lowered position. This arm is U-shaped, as shown in Fig. 2, the outer or offset portion lying below the head when the latter is in lowered position. The axial portions 137 and 137a of the arm 136 are journaled in a bearing 138 and an escutcheon plate 139 set in and secured to the edge of the rear side plate 21 and also in bearing 139a carried on the front side plate 20. Keyed to the part 137 is a sleeve 141 having a crank arm 142, the outer end of which is pivoted to a link 143 secured to the rod 144 of a piston movable in the pressure cylinder 145. The cylinder 145 is pivoted to a bracket 147 secured to the side plate 21. This cylinder moves the arm between the lowered position shown in Figs. 2, 3, and 10 and the raised position shown in dotted lines in Fig. 3 and in full lines in Fig. 11.

When the charge of grain is introduced into the gun through the feed chute 18, the operator steps on a switch 149 located at a convenient point near the door to the bin and this, through the wiring shown in Fig. 12, operates a valve mechanism indicated diagrammatically by the numeral 151 in Fig. 12 to project the piston in the cylinder 145 outwardly, raising the arm and closing the head of the gun. The valve mechanism 151 at the head of the cylinder may be of any standard type and the details thereof are not illustrated. Other operating cylinders are likewise equipped with similar reversing mechanisms.

During the time that the gun head is raised, the locking arm 119 is also raised and held in the position shown in Fig. 9 by an arm 155, which may be termed the firing arm. This arm is fixed to a sleeve 156 keyed to a horizontal shaft 157 and held in position by a nut 158, threaded on the end of the shaft and held thereby against a collar 159 pinned to the shaft. Shaft 157 is rotatable in a bearing 160 bolted near the top right hand upper corner of the front side plate 20 and in a second bearing block 162 near the left hand upper corner of side plate 20. A nut 163 on the end of shaft 157 holds it in position in its bearings in conjunction with collar 159.

The bearing 163 is formed with a vertical housing and guideway 166. At this guideway and keyed to shaft 157 is a shaft operating pinion 167. This pinion meshes with a vertically moving rack 168 located between the pinion and the guideway 166 (Fig. 6). The lower end of rack 168 is pinned to a block 170 that is threaded on the end of rod 171 connected to a piston in the fluid pressure cylinder 172. Cylinder 172 is mounted on angle irons 174 welded to blocks 175 which are, in turn, welded to the side plate 20. As the piston in the cylinder 172 moves downwardly, the firing arm 155 will move upwardly and as the head 125 on the locking arm 119 is in the path of the firing arm the arm will be moved from its lowered or locking position shown in full lines in Figs. 2 and 3 to its raised or firing position shown in dotted lines in Figs. 2 and 3 and full lines in Fig. 9. The movement of the piston in the cylinder 172 is controlled by valve mechanism indicated diagrammatically by the numeral 176 in Fig. 12.

As the freeing of the locking arm takes considerable force and momentum, the firing arm is weighted by means of a heavy bar 178 carried on arms 179 extending from the shaft 157 between its bearings. A cushion block 180 mounted on the side plate 20 receives the impact of the bar 178 on its downstroke. While the weight of the bar 178 might be sufficient to free the locking arm, it is desirable to supplement that weight by pressure behind the piston, moving the piston downwardly. The firing arm is lowered by reverse movement of the piston, controlled through the valve mechanism 176.

It is also necessary to provide means to receive and absorb the impact of the locking arm as it is violently thrown to its upper or unlocking position by the firing arm 155. For this purpose, a heavy beam of metal 182 is suspended by cables 183 from the roof of the bin, a recess 184 being provided in the beam to receive the impact of the locking arm.

In the operation of the gun, the firing arm remains in its raised position, holding the locking arm out of the path of the head 2 until the head has been raised by the arm 136. When the arm 136 is brought to its raised position, holding the head against the mouth of the gun, the firing arm 155 moves downwardly to its lowered position and the locking arm drops into the slot in the outer end of the head supporting arm 115.

It is also necessary to insure that the head is securely closed. For this purpose there is provided a heavy hammer or driver 190 which is brought downward with great force against the nut 125 on the locking arm. The hammer is guided in its movement by an apertured plate 191 secured to the wall 17 of the bin through the bracing angle iron 192. At its upper end, the hammer is pivoted at 195 to a clevis on the end of a rod 196 connected to a piston in the fluid pressure cylinder 197 which is also carried on the inside of the wall 17. The piston in cylinder 197 is raised and lowered by valve mechanism diagrammatically illustrated in Fig. 12 at 198. While the weight of the hammer 190 may be sufficient, it is desirable to supplement that weight by pressure behind the piston, forcing the piston and hammer downwardly. The hammer is raised on the reverse movement of the piston, controlled through the valve mechanism 198, which is actuated by a switch 199, the arm of which bears against the hammer 190. As the hammer reaches the lower end of its movement, the arm of the switch 199 passes off the hammer and sets the valve 198 so as to return the hammer immediately to its raised position.

The sequence of operations of the three instrumentalities which operate the head, i. e., the head lifting arm 136, the firing arm 155, and the hammer 190, is as follows:

When the head is open, as in Fig. 9, the arm 136 is in its lowered position below the head and the firing arm is in its raised position holding the locking arm in its raised position, out of the path of the head. The hammer is also raised. When the operator steps on the switch 149, the arm 136 is raised, closing the head. As the arm 136 completes its upward stroke, the firing arm returns to its lower or idle position. The locking arm drops into the slot 120 in the head supporting arm 115. The arm 136 now returns to its lowered position and the hammer is dropped onto the locking arm with great force, driving the locking arm home. The hammer instantly returns to its raised position.

The gun is now securely locked. In the meantime, the operator has moved to the starting lever 85 and raised it to the full line position shown in Fig. 4 and the gun starts to rotate and the timer 104 begins to function. At the end of the process, the gun is arrested at the point with the locking arm at the top of the drum, as has been described. The timer then actuates the valve mechanism 176 at the cylinder 172 for the firing arm, raising it to throw the locking arm out of engagement with the head, and the explosion and discharge of the grain ensues.

To obtain the sequence of operations which brings the gun to the point where the starting lever may be actuated, two collars 200 and 202 are keyed to the outwardly projecting portion of the shaft 137. A third collar 203 is also keyed to the shaft 137 and from this collar extend two parallel arms 204. The collar 200 is in alignment with and operates a micro-switch 205 by a pin 206 projecting from the collar. Collar 202 is in alignment with and operates a micro-switch 208 by a pin 209 projecting from that collar. The switches 205 and 208 are in line and are carried on the underside of the bracket 210 attached to the side plate 21. These switches are so located that they are actuated when the arm 136 is at the top of its swing. The switch 205 reverses the valve mechanism at 176 and returns the firing arm to its lowered position. The switch 208 reverses the valve mechanism at 151 and returns the arm 136 to its lowered position.

Located in the ends of the arm 204 is a transverse pin 211 on which is freely pivoted a dog 212, movement of which in one direction is prevented by a stop pin 214. When the arm 136 is in its lowered position, the dog 212 lies behind the operating arm 215 of a micro-switch 216 carried by the side plate 21. As the composite arm 204 swings outwardly during the raising of the head, the dog 212 rotates on the pin 211 so that the dog passes idly over the switch arm 215. On return movement, however, the backward movement of the dog 212 is prevented by the pin 214 so that, as the arm contacts the switch arm 215, the dog straightens out and becomes temporarily a rigid extension of the arm 204 as shown in dotted lines in Fig. 11. This action depresses the arm 215 and closes the switch 216.

The switch 216 closes the circuit to the valve mechanism 198 of the hammer cylinder operating the piston in cylinder 197 to drive the hammer against the end of the locking pin. This operation occurs after the lifting arm 136 and the firing arm are lowered. The return movement of the hammer is through the switch 199, as has been described.

The diagrammatic layout (Fig. 12)

The steam for creating pressure within the gun enters the system through the line 220 and the diaphragm operated valve 221, thence through the manually regulated flow control valve 222 to the line 224, which connects to the pipe 42 leading to the interior of the gun. A line 225 leads from the pipe 42 to the pressure gage 226. Connected to the line 224 is an outlet line 228 for bleeding the gun at the end of the cooking period. The discharge line is controlled by the diaphragm valve 230.

The valves 221 and 230 are actuated through air lines 232 and 233 respectively, extending to and controlled by the timer 104. Air under pressure enters the system through a line 234 which leads to the timer. A branch line 235 leads to the temperature control unit 28. A second line 236 conducts air to the several operative cylinders, a branch line 237 leading to the valve mechanism 151 on the cylinder 145 for the head lifting arm, a second line 238 to the valve mechanism 176 at the firing arm cylinder 172 and a third line 239 to the valve mechanism 198 for the hammer cylinder 197.

Electric current enters the system at the point 240. A circuit 241, which leads through the switch 102 at the starting lever 85 and the timer, sets the timer in motion when the starting lever is raised to close this circuit and this circuit remains closed until the operation of the timer is stopped momentarily after the dropping of the arm 85. A shunt circuit 242 leads from the line 241 to the timer. In this circuit is located in series the solenoid 100 which releases the lever 85 and the switch 105 which insures the upright position of the gun for the firing operation. As explained heretofore, there is also a time controlled switch in the timer which closes these circuits when the process is at an end.

From the supply lines at 240, lines go to a transformer 245 from which a line 246 goes to the timer. From line 246 a circuit 248 passes through the switch 149, through the valve mechanism 151, through switch 208, and back to the transformer. One end of a shunt circuit 250 is connected to the circuit 248, passes through the switch 205, valve mechanism 176, and back to the timer. A second shunt circuit is connected at both ends to the circuit 248, passing through the switch 216, through the valve mechanism 198 and switch 199.

Résumé

It is believed that the operations of the mechanism will have been understood from the detailed description. Briefly summarized, they are as follows:

The operator, having charged the gun with the required amount of grain, closes the switch 149 which, through valve mechanism 151 at the cylinder 145, raises the head lifting arm 136. When the arm 136 reaches the top of its stroke, it is returned through the closing of the switch 208, which reverses the valve mechanism 151. At the same time, the switch 205 reverses the valve mechanism 176 at cylinder 172 and lowers the firing arm, which drops the locking arm 119 over the head. As the arm 136 reaches the lower limit of its return movement, the switch 216 is closed by the dog 212, which actuates the valve mechanism 198 at the hammer cylinder 197. This brings the hammer down on the locking arm 119, the hammer being immediately returned by the switch 199.

The gun is now ready for the grain treating operation, which is initiated by raising the lever 85 which starts the gun in operation and also starts the timer. The first operation performed by the timer is to open the valve 230, which permits the gun to bleed for approximately 10 seconds to remove any condensate from the gun. Valve 230 is then closed by the timer and valve 221 opened to admit steam to the gun. Steam is allowed to flow into the gun to bring the pressure to the correct degree, depending upon the contents of the gun. The gun is meanwhile in rotation and subjected to the heat from the burner. After the processing period, the timer closes the circuit 241 which, through the shunt circuit 242, will energize the solenoid 100 at the moment when the switch 105 is closed by the gun. The starting lever is now released, stopping the rotation of the gun and opening the circuit 241, but the arrangement in the timer will permit it to function for a moment thereafter. The valve 221 will close and the circuit 250 will also be closed, actuating the firing arm, which strikes the locking arm and releases the puffed grain, completing the cycle. The operator, with an air line (not shown), blows any remaining grain out of the gun and admits the new charge.

The timer 104 is of any standard make, a number of timing mechanisms being on the market and available for this type of operation. As the details of the various types of timers suitable for the purpose are quite complicated and form no part of the present invention, they have not been illustrated.

It will be seen from the description and drawings that the mechanism is almost completely automatic, the only manual operations required being the gun loading and cleaning operations, the closing of the switch 149, and raising the lever 85 to its driving position.

While the description has been given in great detail, it will be appreciated that the mechanism shown for controlling the various operations may be altered in many ways. The mechanism shown is what has been developed to relieve the operator of much manual labor and to secure more uniform results and much greater production at less cost. The claims which are appended hereto are not intended to be limited by the specific mechanism shown herein, except insofar as expressly stated in the claims and as required by the prior art.

What is claimed is:

1. A grain puffing machine comprising a gun rotatable upon its axis, a head to close the mouth of the gun, means to rotate the gun, means to stop the rotation of the gun at a fixed point after a predetermined processing period, a locking device for the head of the gun, a firing arm movable over the mouth of the gun, and means actuated after the gun has stopped its rotation to move the firing arm to free the locking device.

2. A grain puffing machine comprising a gun rotatable upon its axis, means to rotate the gun, a pivoted head to close the mouth of the gun, means to rock the head into contact with the mouth of the gun, a lock for the head of the gun, an arm movable across the head and operable to release the lock while moving in one direction and to restore the lock to locking position when moved in the other direction, means to arrest the rotation of the gun after a predetermined processing period in position with the lock in the path of the arm and means operative while the gun is at rest to actuate the arm.

3. A grain puffing machine comprising a gun rotatable upon its axis, a pivoted head to close the mouth of the gun, a locking device for the head of the gun, a firing arm movable across the head of the gun and operable to release the locking device while moving in one direction and to restore the locking device to locking position while moving in the opposite direction, and a head closing device operable to move the head to closed position between the movements of the firing arm.

4. A grain puffing machine comprising a gun, a pivoted head to close the mouth of the gun, a pivoted locking arm movable into engagement with the head while in closed position, a firing arm reciprocable across the mouth of the gun, said firing arm striking the locking arm and releasing it from the head in one direction of its movement and restoring the locking arm to head engaging position on its return movement, a reciprocable head lifting arm operable to raise the head into engagement with the gun, means to actuate the said lifting arm to raise the head and to return the firing arm and the lifting arm thereafter.

5. A grain puffing machine comprising a gun, a pivoted head to close the mouth of the gun, a pivoted locking arm movable into engagement with the head while in closed position, a firing arm reciprocable across the mouth of the gun, said firing arm striking the locking arm and releasing it from the head in one direction of its movement and restoring the locking arm to head engaging position on its return movement, a reciprocable head lifting arm operable to raise the head into engagement with the gun, means to actuate the said lifting arm to raise the head and to return the firing arm and the lifting arm thereafter, a hammer for the locking device, and means to drive the hammer against the locking arm after the return of the firing arm and the lifting arm.

6. A grain puffing machine comprising a gun, means to rotate the gun, means to stop the rotation of the gun at a fixed point after a predetermined interval, a head on the gun, a lock to hold the head over the mouth of the gun, a firing arm movable across the head to strike the lock and release the head, and means to actuate the firing arm while the gun is at rest, said fixed point at which the gun stops being with the lock in the path of the firing arm.

7. A grain puffing machine comprising a gun, means to rotate the gun, a timing device, a head on the gun, a lock to hold the head over the mouth of the gun, a firing arm movable across the mouth of the gun to strike the lock and release the head, and means controlled by the timer to stop the rotation of the gun after a predetermined interval with the lock in the path of the firing arm and thereafter to actuate the firing arm.

8. A grain puffing machine comprising a gun, means to rotate the gun, a timer, means acting simultaneously to start the rotation of the gun and the operation of the timer, a head on the gun, a lock to hold the head over the mouth of the gun, a firing arm reciprocable across the head to strike the lock and release the head when moving in one direction and to shift the lock onto the head on its return movement, and means controlled by the timer to stop the rotation of the gun after a predetermined interval and thereafter to actuate the firing arm.

9. A grain puffing machine comprising a gun, means to rotate the gun, a timer, means acting simultaneously to start the rotation of the gun and the operation of the timer, a head on the gun, a lock to hold the head over the mouth of the gun, a firing arm reciprocable across the head to strike the lock and release the head when moving in one direction and to shift the lock onto the head on its return movement, and means controlled by the timer to bring the gun to rest with the lock in the path of the firing arm, after a predetermined interval and thereafter to actuate the firing arm.

10. A grain puffing machine comprising a gun, means to rotate the gun, a timer, means acting simultaneously to start the rotation of the gun and the operation of the timer, a head on the gun, a lock mounted on the gun and movable into position to hold the head over the mouth of the gun, a firing arm reciprocable across the head to strike the lock and release the head when moving in one direction and to shift the lock onto the head on its return movement, means to move the head against the mouth of the gun before the return movement of the firing arm, and means controlled by the timer to stop the rotation of the gun after a predetermined interval and thereafter to actuate the firing arm.

11. A grain puffing machine comprising a gun, means to rotate the gun, a timer, means acting simultaneously to start the rotation of the gun and the operation of the timer, a head on the gun, a lock mounted on the gun and movable into position to hold the head over the mouth of the gun, a firing arm reciprocable across the head to strike the lock and release the head when moving in one direction and to shift the lock onto the head on its return movement, means to move the head against the mouth of the gun before the return movement of the firing arm, and means controlled by the timer to bring the gun to rest with the lock in the path of the firing arm after a predetermined interval and thereafter to actuate the firing arm.

12. A grain puffing machine comprising a gun, means to rotate the gun, a timer, means acting simultaneously to start the rotation of the gun and the operation of the timer, a head on the gun, a lock to hold the head over the mouth of the gun, means to move the head into contact with the mouth of the gun, means to shift the lock onto the head, a hammer in line with the lock, means actuated after the lock is over the head to drive the hammer against the lock, and means controlled by the timer to bring the gun to rest with the lock in the path of the hammer.

13. A grain puffing machine comprising a gun, means to rotate the gun, a timer, means acting simultaneously to start the rotation of the gun and the operation of the timer, a head on the gun, a lock to hold the head over the mouth of the gun, means to move the head over the mouth of the gun, a firing arm reciprocable over the head of the gun, the firing arm when moving in one direction releasing the lock and on its return shifting the lock over the head, means to move the head into contact with the mouth of the gun before the return movement of the firing arm, a hammer, means to drive the hammer against the lock after the return of the firing arm, and means controlled by the timer to bring the gun to rest with the lock in the path of the firing arm and thereafter to move the firing arm across the mouth of the gun.

14. A grain puffing machine comprising a gun, means to rotate the gun, a timer, means acting simultaneously to start the rotation of the gun and the operation of the timer, a head on the gun, a lock to hold the head over the mouth of the gun, means to move the head over the mouth of the gun, a firing arm reciprocable over the head of the gun, the firing arm when moving in one direction releasing the lock and on its return shifting the lock over the head, means to move the head into contact with the mouth of the gun before the return movement of the firing arm, a hammer, means to drive the hammer against the lock after the return movement of the firing arm, and means controlled by the timer to bring the gun to rest with the lock in the path of the firing arm and in the path of the hammer and thereafter to move the firing arm across the mouth of the gun.

15. A grain puffing machine comprising a gun, means to rotate the gun, a timer, means acting simultaneously to start the rotation of the gun and the operation of the timer, a head on the gun, a lock to hold the head over the mouth of the gun, means to move the head over the mouth of the gun, a firing arm reciprocable over the head of the gun, the firing arm when moving in one direction releasing the lock and on its return shifting the lock over the head, means to move the head into contact with the mouth of the gun before the return movement of the firing arm, a hammer, means actuated by the head moving means to drive the hammer against the lock after the return movement of the firing arm, and means controlled by the timer to bring the gun to rest with the lock in the path of the firing arm and thereafter to move the firing arm across the mouth of the gun.

16. A grain puffing machine comprising a gun, means to rotate the gun, a timer, means acting simultaneously to start the rotation of the gun and the operation of the timer, a head on the gun, a lock to hold the head over the mouth of the gun, means to move the head over the mouth of the gun, a firing arm reciprocable over the head of the gun, the firing arm when moving in one direction releasing the lock and on its return shifting the lock over the head, means to move the head into contact with the mouth of the gun before the return movement of the firing arm, a hammer, means actuated by the head moving means to drive the hammer against the lock after the return movement of the firing arm, and means controlled by the timer to bring the gun to rest with the lock in the path of the firing arm and in the path of the hammer and thereafter to move the firing arm across the mouth of the gun.

17. A grain puffing machine comprising a gun, a head on the gun and movable to close the mouth of the gun, an arm movable to close the head against the mouth of the gun, a lock movable into engagement with the head, a firing arm reciprocable across the head, means to move the firing arm to release the lock in one direction and to restore the lock to locking position on its return movement, and means actuated at the end of the head closing movement of the first named arm to start the firing arm on its return movement.

18. A grain puffing machine comprising a gun, a head on the gun and movable to close the mouth of the gun, an arm movable to close the head against the mouth of the gun, a lock movable into engagement with the head, a firing arm reciprocable across the head, means to move the firing arm to release the lock in one direction and to restore the lock to locking position on its return movement, means actuated at the end of the head closing movement of the first named arm to start the firing arm on its return movement, a hammer, and means actuated by the first named arm to cause the hammer to strike the lock after the firing arm begins its return movement.

19. A grain puffing machine comprising a gun, a head on the gun and movable to close the mouth of the gun, an arm movable to close the head against the mouth of the gun, a lock movable into engagement with the head, a firing arm reciprocable across the head, means to move the firing arm to release the lock in one direction and to restore the lock to locking position on its return movement, means actuated at the end of the head closing movement of the first named arm to start the firing arm on its return movement, a drop hammer over the lock, and trip mechanism actuated by the first named arm after the lock has been restored to locking position to release the hammer.

20. A grain puffing machine comprising a gun, a head pivoted on the gun, a swinging arm movable to raise the head against the mouth of the gun, a pivoted locking arm on the gun adapted to engage the head in locking position, a firing arm mounted to sweep across the gun to raise the locking arm in one direction and to restore the locking arm on its return movement, and means actuated by the swinging arm at the end of its head raising stroke to start the firing arm on its return movement.

21. A grain puffing machine comprising a gun, a head pivoted on the gun, a swinging arm movable to raise the head against the mouth of the gun, a pivoted locking arm on the gun adapted to engage the head in locking position, a firing arm mounted to sweep across the gun to raise the locking arm in one direction and to restore the locking arm on its return movement, means actuated by the swinging arm at the end of its head raising stroke to start the firing arm on its return movement, a drop hammer over the lock, and trip mechanism actuated by the swinging arm after the locking arm has been restored to locking position to release the hammer.

22. A grain puffing machine comprising a rotatable gun, means to rotate the gun, a timer to arrest the rotation of the gun after a predetermined period, a head on the gun, an arm movable to close the head against the mouth of the gun, a lock movable into engagement with the head, a firing arm reciprocable across the head, means actuated when the gun is arrested to move the firing arm to release the lock in one direction and to restore the lock to locking position on its return movement, and means actuated at the end of the head closing movement of the first named arm to start the firing arm on its return movement.

23. A grain puffing machine comprising a rotatable gun, means to rotate the gun, a timer to arrest the rotation of the gun after a predetermined period, a head on the gun, an arm movable to close the head against the mouth of the gun, a lock movable into engagement with the head, a firing arm reciprocable across the head, means actuated when the gun is arrested to move the firing arm to release the lock in one direction and to restore the lock to locking position on its return movement, means actuated at the end of the head closing movement of the first named arm to start the firing arm on its return movement, a hammer, and means actuated by the first named arm to cause the hammer to strike the lock after the firing arm begins its return movement.

24. A grain puffing machine comprising a rotatable gun, means to rotate the gun, a timer to arrest the rotation of the gun after a predetermined period, a head on the gun, an arm movable to close the head against the mouth of the gun, a lock carried by the gun and rotatable therewith, said lock being movable into engagement with the head, a firing arm reciprocable across the head, means actuated when the gun is arrested to move the firing arm to release the lock in one direction and to restore the lock to locking position on its return movement, means actuated at the end of the head closing movement of the first named arm to start the firing arm on its return movement, and means to insure that the gun is arrested with the lock in the path of the firing arm.

25. A grain puffing machine comprising a rotatable gun, means to rotate the gun, a timer to arrest the rotation of the gun after a predetermined period, a head on the gun, an arm movable to close the head against the mouth of the gun, a lock movable into engagement with the head, a firing arm reciprocable across the head, means actuated when the gun is arrested to move the firing arm to release the lock in one direction and to restore the lock to locking position on its return movement, means actuated at the end of the head closing movement of the first named arm to start the firing arm on its return movement, a hammer, means actuated by the first named arm to cause the hammer to strike the lock after the firing arm begins its return movement, and means to insure that the gun is arrested with the lock in the path of the firing arm and in the path of the hammer.

26. A grain puffing machine comprising a gun, a head on the gun and movable to close the mouth of the gun, an arm to move the head against the mouth of the gun, a lock, means to shift the lock into engagement with the head, a hammer in alignment with the lock, and a single manually operated means to actuate the arm, then to shift the lock and drive the hammer against the lock.

27. A grain puffing machine comprising a rotatable gun, a head on the gun and movable to close the mouth of the gun, an arm to move the head against the mouth of the gun, a lock, means to shift the lock into engagement with the head, a hammer in alignment with the lock, a single manually operated means operable while the gun is at rest to actuate the arm, then to shift the lock and drive the hammer against the lock, a firing arm movable across the head of the gun to release the lock, a single manually operated means to set the gun in rotation, a timer to arrest the movement of the gun with the lock in the path of the firing arm, and means actuated by the timer while the gun is at rest to move the firing arm.

ROBERT H. ERNEST.

REFERENCES CITED

The following references are of record in the file of this patent:

UNITED STATES PATENTS

| Number | Name | Date |
|---|---|---|
| 1,395,014 | Rowell | Oct. 25, 1921 |
| 1,878,782 | Kirn | Sept. 20, 1932 |
| 2,086,266 | Heve et al. | July 6, 1937 |
| 2,259,802 | Crosby | Oct. 21, 1941 |
| 2,279,868 | Hayden | Apr. 14, 1942 |
| 2,539,990 | Chapman et al. | Jan. 30, 1951 |